(12) United States Patent
You et al.

(10) Patent No.: US 10,444,567 B2
(45) Date of Patent: Oct. 15, 2019

(54) DISPLAY DEVICE

(71) Applicant: SAMSUNG DISPLAY CO., LTD., Yongin-si, Gyeonggi-do (KR)

(72) Inventors: Jun Woo You, Yongin-si (KR); Sun Hee Oh, Yongin-si (KR); Tae Ho Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 15/860,062

(22) Filed: Jan. 2, 2018

(65) Prior Publication Data

US 2018/0188604 A1 Jul. 5, 2018

(30) Foreign Application Priority Data

Jan. 4, 2017 (KR) .................. 10-2017-0001502

(51) Int. Cl.
*G02F 1/1335* (2006.01)
*G02F 1/19* (2019.01)
*G02F 1/1343* (2006.01)
*G02F 1/13357* (2006.01)

(52) U.S. Cl.
CPC ...... *G02F 1/133602* (2013.01); *G02F 1/1336* (2013.01); *G02F 1/1343* (2013.01); *G02F 1/133504* (2013.01); *G02F 1/133553* (2013.01); *G02F 1/19* (2013.01); *G02F 1/133617* (2013.01)

(58) Field of Classification Search
CPC .................................. G02F 1/133602
See application file for complete search history.

(56) References Cited

U.S. PATENT DOCUMENTS

| | | | |
|---|---|---|---|
| 2002/0041349 A1* | 4/2002 | Ohkawa | G02B 6/0036 349/65 |
| 2006/0109681 A1* | 5/2006 | Kim | G02B 6/0038 362/606 |
| 2015/0301268 A1 | 10/2015 | Bita et al. | |
| 2016/0147101 A1* | 5/2016 | Saneto | G02F 1/13362 349/71 |
| 2016/0252776 A1* | 9/2016 | Sun | G02F 1/133603 362/97.3 |

* cited by examiner

*Primary Examiner* — Edmond C Lau
(74) *Attorney, Agent, or Firm* — Cantor Colburn LLP

(57) ABSTRACT

A display device includes a light source unit and a display panel provided on the light source unit, the light source unit includes a reflective layer which reflects light incident thereonto, a refractive layer provided on the reflective layer, and a light source which is provided to be spaced apart from the refractive layer and emits light toward the refractive layer, where the refractive layer has different refractive indices depending on distances from the light source to the refractive layer.

19 Claims, 3 Drawing Sheets

DISPLAY DEVICE

The application claims priority to Korean Patent Application No. 10-2017-0001502, filed on Jan. 4, 2017, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

In general, a liquid crystal display ("LCD") is a display device for obtaining a desired image signal by applying an electric field to liquid crystals having an anisotropic dielectric constant, which are formed between two substrates, and controlling electric field intensity, thereby controlling an amount of light transmitted through the two substrates. The LCD generally includes the two substrates, a liquid crystal layer formed therebetween, a backlight unit that provides light to the liquid crystal layer, and the like.

SUMMARY

Exemplary embodiments provide a display device that includes a refractive layer and a reflective layer, thereby outputting a clear screen.

According to an exemplary embodiment of the invention, there is provided a display device including a light source unit and a display panel provided on the light source unit, where the light source unit includes a reflective layer which reflects light incident thereonto, a refractive layer provided on the reflective layer, and a light source which is provided to be spaced apart from the refractive layer and emits light toward the refractive layer, where the refractive layer has different refractive indices depending on distances from the light source to the refractive layer.

In an exemplary embodiment, the refractive layer may refract incident light such that light transmitted through an arbitrary region of the refractive layer has a refraction angle of 0 degree to 30 degrees.

In an exemplary embodiment, the refractive index of the refractive layer may become larger as the distance from the light source to the refractive layer becomes longer.

In an exemplary embodiment, the refractive layer may include a plurality of sub-layers having refractive indices different from one another.

In an exemplary embodiment, the plurality of sub-layers may be provided not to overlap with each other on a plane.

In an exemplary embodiment, each of the plurality of sub-layers may be provided more distant from the light source as the refractive index of the sub-layer becomes larger.

In an exemplary embodiment, the plurality of sub-layers may have a form in which the plurality sub-layers are sequentially stacked from a sub-layer having a smallest refractive index, and a number of sub-layers may increase as the distance from the light source becomes longer.

In an exemplary embodiment, the plurality of sub-layers may have a form in which the plurality sub-layers are sequentially stacked from a sub-layer having a largest refractive index, and a number of sub-layers may increase as the distance from the light source becomes longer.

In an exemplary embodiment, the plurality of sub-layers may have a difference in refractive index of 0.01 to 0.07 therebetween.

In an exemplary embodiment, the refractive layer may include one to twenty sub-layers.

In an exemplary embodiment, thicknesses of the plurality of sub-layers may be equal to one another.

In an exemplary embodiment, a sub-layer of the plurality of sub-layers may have a thickness of 8 micrometers (μm) to 12 μm.

In an exemplary embodiment, the refractive layer may have a refractive index of 1.3 to 5.0.

In an exemplary embodiment, the display device may further include a color conversion layer provided on the refractive layer.

In an exemplary embodiment, the light source may be provided in plural numbers. In a plan view, the plurality of light sources may be provided at both sides of the refractive layer, respectively.

In an exemplary embodiment, the light source may be spaced apart from the refractive layer at a first height $h_1$, and the refractive layer has a first length $d_1$. The first height and the first length satisfy the following Expression 1:

$$i2 < h_1/d_1 < i3. \qquad \text{<Expression 1>}$$

In an exemplary embodiment, the light source may emit light in a Lambertian form.

In an exemplary embodiment, the display device may have a display area and a non-display area, the refractive layer may be provided on the display area, and the light source may be provided on the non-display area.

In an exemplary embodiment, the display panel may further include a liquid crystal layer, and a first electrode and a second electrode, which are provided in a state in which the first and second electrodes are spaced apart from each other with the liquid crystal layer interposed therebetween.

BRIEF DESCRIPTION OF THE DRAWINGS

Exemplary embodiments, features and advantages will now be described more fully hereinafter with reference to the accompanying drawings, in which.

DETAILED DESCRIPTION

Figure 1:
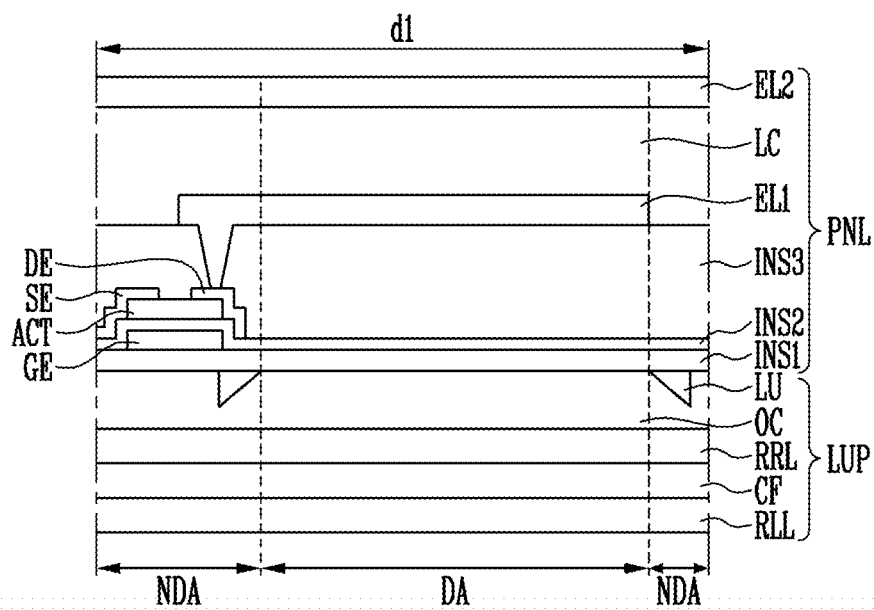
FIG. 1 is a cross-sectional view of an exemplary embodiment of a display device according to the invention.

The disclosure may apply various changes and different shape, therefore only illustrate in details with particular examples. However, the examples do not limit to certain shapes but apply to all the change and equivalent material and replacement. The drawings included are illustrated a fashion where the drawing figures are expanded for the better understanding.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

In the disclosure, relative terms 'top surface' and 'bottom surface' are used as relative concepts to facilitate the understanding of the invention. Therefore, 'top surface' and 'bottom surface' do not designate a specific direction, position, or component and may be interchangeable. For example, 'top surface' may be interpreted as 'bottom surface' and 'bottom surface' may be interpreted as 'top surface.' Therefore, 'top surface' may be represented as 'first surface' and 'bottom surface' may be represented as 'second surface,' while 'top surface' may be represented as 'second surface' and 'bottom surface' may be represented as 'first surface.' However, 'top surface' and 'bottom surface' are not mixed with each other in one embodiment.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a cross-sectional view of a display device according to an exemplary embodiment of the invention.

Referring to FIG. 1, the display device according to the exemplary embodiment of the invention includes a light source unit LUP and a display panel PNL provided on the light source unit LUP.

The display panel PNL may receive light emitted from the light source unit LUP to output an image. Therefore, the display panel PNL according to the exemplary embodiment of the invention is a light receiving type display panel. Examples of the light receiving type display panel are a liquid crystal type display panel including a liquid crystal layer, an electrophoretic type display panel, an electrowetting type display device, and the like. In the exemplary embodiment of the invention, the display device including a liquid crystal type display panel will be described, for example.

When the display panel PNL is a liquid crystal type display panel, the display panel PNL may include a liquid crystal layer LC, and a first electrode EL1 and a second electrode EL2, which are provided in a state in which the first electrode EL1 and the second electrode EL2 are spaced apart from each other with the liquid crystal layer LC interposed therebetween. Liquid crystal molecules included in the liquid crystal layer LC are driven according to an electric field applied to the liquid crystal layer LC. Specifically, the liquid crystal molecules having dielectric anisotropy may be aligned in a predetermined direction according to the electric field applied to the liquid crystal layer LC.

The liquid crystal layer LC used in the display device according to the exemplary embodiment of the invention and a liquid composition included in the liquid crystal layer LC are not particularly limited. Therefore, the display device according to the invention may include liquid crystal display devices having various modes. In an exemplary embodiment, the display device may include a vertical alignment ("VA") mode liquid crystal display device, a fringe field switching ("FFS") mode liquid crystal display device, an in plane switching ("IPS") mode liquid crystal display device, a plane to light switching ("PLS") mode liquid crystal display device, and the like, for example. The liquid crystal composition may have a negative dielectric anisotropy or a positive dielectric anisotropy according to the driving mode of the display device. When the liquid crystal composition has a negative dielectric anisotropy, the display device may be a VA mode liquid crystal display device. In this case, the display device may be particularly a multi-domain vertical alignment ("MVA") mode liquid crystal display device, a patterned vertical alignment ("PVA") mode liquid crystal display device, or a polymer stabilized vertical alignment ("PS-VA") mode liquid crystal display device. When the liquid crystal composition has a positive dielectric anisotropy, the display device may be a horizontal alignment mode liquid crystal display device.

An alignment layer for aligning the liquid crystal molecules in the liquid crystal layer LC may be further provided on the top or bottom of the liquid crystal layer LC. The alignment layer allows the liquid crystal molecules to be aligned in a predetermined direction, so that the liquid crystal molecules can be rotated in a predetermined direction when the electric field is applied to the liquid crystal layer LC. In addition, a sealant may be further provided along the circumference of the liquid crystal layer LC. The sealant seals the liquid crystal layer LC, so that the liquid crystal layer LC can be prevented from being leaked to the outside.

The first electrode EL1 and the second electrode EL2 are spaced apart from each other with the liquid crystal layer LC interposed therebetween. In an exemplary embodiment, the first electrode EL1 and the second electrode EL2 may be a pixel electrode and a common electrode, respectively, for example. In FIG. 1, it is illustrated that the first electrode EL1 is a pixel electrode and the second electrode EL2 is a common electrode. However, FIG. 1 is merely an exemplary embodiment of the invention. Unlike FIG. 1, in another exemplary embodiment, the first electrode EL1 may be a common electrode and the second electrode EL2 may be a pixel electrode. A voltage may be applied to the first electrode EL1 and the second electrode EL2 so as to apply an electric field to the liquid crystal layer LC. When the first electrode EL1 is a pixel electrode and the second electrode EL2 is a common electrode, different voltages may be applied to the first electrode EL1 according to on-off of a pixel. The liquid crystal molecules having the dielectric anisotropy in the liquid crystal layer LC are rotated according to the voltage applied to the first electrode EL1. Since the liquid crystal molecules also have refractive anisotropy, light emitted from a light source LU in the light source unit LUP may be transmitted or may not be transmitted through the liquid crystal layer LC according to the alignment state of the liquid crystal molecules, caused by the rotation of the liquid crystal molecules in the liquid crystal layer LC.

The first electrode EL1 and the second electrode EL2 may include a transparent conductive material. In an exemplary embodiment, each of the first electrode EL1 and the second electrode EL2 may include a transparent conductive polymer, a transparent conductive oxide, etc., for example. In an exemplary embodiment, the material available for the transparent conductive oxide may include indium tin oxide ("ITO"), indium zinc oxide ("IZO"), indium tin zinc oxide ("ITZO"), and the like, for example.

The display panel PNL may further include a gate electrode GE, an active pattern ACT, a source electrode SE, and a drain electrode DE. The components constitute a transistor, to drive the first electrode EL1. In this case, the gate electrode GE may be connected to a gate line, and the source electrode SE may be connected to a data line. Specifically, when the transistor is turned on in response to a gate signal provided through the gate line, a data voltage provided through the data line may be provided to the first electrode EL1 through the turned-on transistor. When a voltage is applied to the gate electrode GE, a channel is generated in the active pattern ACT. The source electrode SE and the drain electrode DE may be connected to each other through the channel, and the data voltage may be applied to the first electrode EL1 connected to the drain electrode DE.

The gate electrode GE may be formed to cover a region corresponding to a channel region of the active pattern ACT. The gate electrode GE may include a metal. In an exemplary embodiment, the gate electrode GE may include at least one of metals such as gold (Au), silver (Ag), aluminum (Al), molybdenum (Mo), chromium (Cr), titanium (Ti), nickel (Ni), neodymium (Nd), and copper (Cu), or alloys thereof, for example. In addition, the gate electrode GE may be formed in a single layer. However, the invention is not limited thereto, and the gate electrode GE may be formed in a multi-layer in which two or more materials among the metals and the alloys are stacked.

The active pattern ACT includes a semiconductor material. The active pattern ACT may include a source region, a drain region, and the channel region provided between the source region and the drain region. In an exemplary embodiment, the active pattern ACT may be a semiconductor pattern including poly-silicon, amorphous silicon, an oxide semiconductor, or the like, for example. The channel region is a semiconductor pattern undoped with impurities, and may be an intrinsic semiconductor. The source region and the drain region may be semiconductor patterns doped with impurities. The impurities may be impurities such as an n-type impurity, a p-type impurity, and other metals.

Each of the source electrode SE and the drain electrode DE includes a metal. In an exemplary embodiment, each of the source electrode SE and the drain electrode DE may include at least one of metals such as gold (Au), silver (Ag), aluminum (Al), molybdenum (Mo), chromium (Cr), titanium (Ti), nickel (Ni), neodymium (Nd), and copper (Cu), or alloys thereof. In addition, each of the source electrode SE and the drain electrode DE may be formed in a single layer. However, the invention is not limited thereto, and each of the source electrode SE and the drain electrode DE may be formed in a multi-layer in which two or more materials among the metals and the alloys are stacked.

A first insulating layer INS1 may be provided between the display panel PNL and the light source unit LUP. In addition, a second insulating layer INS2 may be provided between the active pattern and the gate electrode GE, and a third insulating layer INS3 may be provided over the source electrode SE and the drain electrode DE. Each of the first insulating layer INS1, the second insulating layer INS2, and the third insulating layer INS3 may be an inorganic insulating layer including an inorganic material, or be an organic insulating layer including an organic material. The inorganic material may include inorganic insulating materials such as polysiloxane, silicon nitride, silicon oxide, and silicon oxynitride. In an exemplary embodiment, the organic material may include organic insulating materials such as a polyacryl-based compound, a polyimide-based compound, a fluorine-based compound such as Teflon, and a benzocyclobutene-based compound, for example. A contact hole through which the first electrode EL1 and the drain electrode DE are connected to each other may be defined in the third insulating layer INS3. The first to third insulating layers INS1 to INS3 have light transmissivity to enable light emitted from the light source unit LUP to be transmitted therethrough.

The display device includes a display area DA and a non-display area NDA provided at at least one side of the display area DA. A plurality of pixels may be provided in the display area DA. Although FIG. 1 illustrates one pixel, according to an exemplary embodiment of the invention, a plurality of pixels may be provided in the display device. A driving unit including transistors, lines, etc. may be provided in the non-display area NDA.

The light source unit LUP includes a reflective layer RLL that reflects light incident thereonto, a refractive layer RRL provided on the reflective layer RLL, and the light source LU provided to be spaced apart from the refractive layer RRL, the light source LU emitting light toward the refractive layer RRL. The light source unit LUP may be provided at the bottom of the display panel PNL, and be provided on the top of the refractive layer RRL.

The reflective layer RLL may have reflexibility to allow light having a specific wavelength band to be reflected therefrom. In an exemplary embodiment, the reflective layer RLL may have reflexibility to allow light in a visible region to be reflected therefrom, for example. To this end, the reflective layer RLL may include a metal that enables light in a visible region to be reflected therefrom. Therefore, in an exemplary embodiment, the reflective layer RLL may include at least one of metals such as aluminum (Al), silver (Ag), chromium (Cr), molybdenum (Mo), iron (Fe), platinum (Pt), mercury (Hg), nickel (Ni), tungsten (W), and vanadium (V), for example. In an exemplary embodiment, the reflective layer RLL may further include a reflective polarizing layer in addition to a metal layer including the metal. Therefore, the reflective layer RLL may be a single layer or a multi-layer, when necessary.

The reflective layer RLL may entirely overlap with the display area DA, corresponding to the display area DA. In an exemplary embodiment, the reflective layer RLL may be provided in a shape extending to the non-display area NDA. In FIG. 1, it is illustrated that the reflective layer RLL extends to not only the display area DA but also the non-display area NDA. However, when necessary, those skilled in the art may not provide the reflective layer RLL in the non-display area NDA, or may provide the reflective layer RLL at only a portion of the non-display area NDA. As described above, the reflective layer RLL is not provided or is partially provided in the non-display area NDA, to enable the reflective layer RLL overlapping with the display area DA not to be exposed to the outside. As the reflective layer RLL is not exposed to the outside, it is possible to prevent external moisture from penetrating into the reflective layer RLL. The moisture penetrating into the reflective layer RLL allows the metal in the reflective layer RLL to become rusty, and therefore, the reflectance of the reflective layer RLL may be lowered.

The refractive layer RRL is provided on the reflective layer RLL. The refractive layer RRL allows light emitted from the light source LU to be refracted in the direction of the reflective layer RLL. The refractive layer RRL may be a single layer or a multi-layer, and include a low refractive material and/or a high refractive material according to the refractive index thereof. The low refractive material may be an organic material or an inorganic material. In an exemplary embodiment, the inorganic material in the low refractive material may include silicon oxide, magnesium fluoride, and the like. In an exemplary embodiment, the organic material in the low refractive material may include an acryl-based compound, polyimide, polyamide, tris(8-hydroxyquinolinato)aluminum (Alq3), and the like, for example. The high refractive material may also be an organic material or an inorganic material. In an exemplary embodiment, the inorganic material in the high refractive material may include zinc oxide, titanium oxide, zirconium oxide, niobium oxide, tantalum oxide, tin oxide, nickel oxide, silicon nitride, indium nitride, gallium nitride, and the like, for example. In an exemplary embodiment, the organic material in the high refractive material may include poly(3,4-ethylenedioxythiophene) ("PEDOT"), 4,4'-bis[N-(3-methylphenyl)-N-phenyl-amino]-biphenyl ("TPD"), 4,4',4''-tris[N-(3-methylphenyl)-N-phenyl-amino]-triphenylamine ("MTDATA"), 1,3,5-tris[N,N-bis(2-methylphenyl) amino]-benzene ("o-MTDAB"), 1,3,5-tris[N,N-bis(3-methylphenyl)amino]-benzene ("m-MTDAB"), 1,3,5-tris[N,N-bis(4-methylphenyl)amino]-benzene ("p-MTDAB"), 4,4'-bis[N,N-bis(3-methylphenyl)-amino]-diphenylmethane ("BPPM"), 2,2',2''-(1,3,5-benzene-tolyl) tris-[1-phenyl-1H-benzoimidazol]("TPBI"), and 3-(4-biphenylyl)-4-phenyl-5-t-butylphenyl-1,2,4-triazole ("TAZ"), and the like, for example. However, the materials available for the high refractive material and the low refractive material are not limited to those described above.

The light source LU emits light toward the refractive layer RRL such that the display device can output an image. In an exemplary embodiment, the light source LU may emit light having at least one color among red, blue, green, yellow, and white, for example. In an exemplary embodiment, the light source LU may emit not only light in a visible region but also light in an ultraviolet region, for example. The light source LU may be provided in a single number or plural numbers. In this case, the light sources LU may emit light of the same color or emit lights of different colors. In an exemplary embodiment, the light source LU may include a light emitting diode ("LED"), an organic electroluminescent thin film, an inorganic electroluminescent thin film, and the like, for example. In an exemplary embodiment, the light source LU may include 2 or 3 element compound semiconductors of Groups 2B, 3B, 4A, 4B, 5B, and 6B, such as silicon carbide (SiC), gallium arsenide (GaAs), gallium phosphide (GaP), gallium-arsenic-phosphorus ($GaAs_{1-x}P_x$), gallium-aluminum-arsenic ($Ga_{1-x}Al_xAs$), indium phosphide (InP), and indium-gallium-phosphorus ($In_{1-x}Ga_xP$), for example.

According to an exemplary embodiment of the invention, the light source LU may emit light in a Lambertian form, for example. Therefore, when light emitted from the light source LU is incident onto the reflective layer RLL, the intensity of the light may be changed depending on an angle at which the light is incident onto the reflective layer RLL. Specifically, as the light is incident more vertically onto the reflective layer RLL, the intensity of light reflected from the reflective layer RLL becomes larger. The light in the Lambertian form obeys Lambert's cosine law. In this case, the surface of the reflective layer may have Lambertian reflectance.

The light source LU provided to be spaced apart from the refractive layer RRL may be provided at one side of the refractive layer RRL. In this case, the refractive layer RRL may be provided on the display area DA, and the light source LU may be provided on the non-display area NDA. The light source LU provided at one side of the refractive layer RRL may have a shape inclined toward the refractive layer RRL. Therefore, the amount of light that is emitted from the light source LU and then released to the outside of the refractive layer RRL may be reduced. In an exemplary embodiment, when the light source LU is provided in plural numbers, for example, the light sources LU may be provided at both sides of the refractive layer RRL. In an exemplary embodiment, when the refractive layer RRL has a rectangular shape and two light sources LU are provided, for example, the two light sources LU may be provided on two parallel sides of the refractive layer RRL, respectively. In an exemplary embodiment, when the refractive layer RRL has a square shape and four light sources LU are provided, for example, the light sources LU may be provided on sides of the refractive layer RRL, respectively. However, the shape of the refractive layer RRL and the number and arrangement of light sources LU are not limited to the above-described examples. Therefore, those skilled in the art may maximize the amount of light incident onto the refractive layer RRL, and control the number and arrangement of light sources LU in a form where a screen can be output most clearly.

A black matrix may be provided on the light source LU, when necessary. The black matrix may be provided on a back surface of the display panel PNL. The black matrix prevents light emitted from the light source LU from being directly incident toward the display panel PNL without passing through the refractive layer RRL. When the light emitted from the light source LU is directly incident into the display panel PNL, the quality of an image output by the display device may be degraded. In an exemplary embodiment, when a color conversion layer CF is provided between the refractive layer RRL and the reflective layer RLL, light directly incident into the display panel PNL without passing through the refractive layer RRL does not have any change in wavelength, caused by the color conversion layer CF, for example. Therefore, the light may have a wavelength band different from that of expected light, and degrade the color clarity of a screen output by the display device. The black matrix provided on the light source LU blocks the light, so that the color clarity of a screen output by the display device can be improved.

An overcoat layer OC may be provided between the light source LU and the refractive layer RRL. The overcoat layer OC allows the light source LU and the refractive layer RRL to be spaced apart from each other. The overcoat layer OC has light transmissivity to enable light reflected from the reflective layer RLL to be transmitted therethrough.

The display device according to the exemplary embodiment of the invention may further include the color conversion layer CF provided on the refractive layer RRL. The color conversion layer CF may convert light emitted from the light source LU. That the color conversion layer CF 'converts light' means that the color conversion layer CF changes the wavelength of light entering thereinto. Specifically, the color conversion layer CF may absorb first light having a first wavelength range and emit at least one light having a wavelength range different from the first wavelength range. In an exemplary embodiment, when light having an ultraviolet wavelength range is absorbed into the color conversion layer CF, for example, a plurality of color conversion layers CF may emit lights having wavelength ranges of a blue light region, a green light region, and a red light region among visible wavelength ranges, respectively. To this end, the color conversion layer CF may include quantum dots and/or phosphors. The number of quantum dots and/or phosphors is not particularly limited, and therefore, those skilled in the art may determine the number of quantum dots and/or phosphors, when necessary.

The phosphors included in the color conversion layer CF may include a red phosphor, a blue phosphor, a green phosphor, a yellow phosphor, a white phosphor, and the like. In an exemplary embodiment, the red phosphor may include at least one of $Y_2O_2S$, $La_2O_2S$, $Ca_2Si_5N_8$, $Sr_2Si_5N_8$, $Ba_2Si_5N_8$, $CaAlSiN_3$, $La_2W_3O_{12}$, $Eu_2W_3O_{12}$, $Ca_3MgSi_2O_8$, $Sr_3MgSi_2O_8$, $Ba_3MgSi_2O_8$, $LiEuW_2O_8$, and $LiSmW_2O_8$, for example. In an exemplary embodiment, the green phosphor may include at least one of $Ca_2SiO_4$, $Sr_2SiO_4$, $Ba_2SiO_4$, BAM, α-SiAlON, $Ca_3Sc_2Si_3O_{12}$, $Tb_3Al_5O_{12}$, and $LiTbW_2O_8$, for example. In an exemplary embodiment, the blue phosphor may include at least one of $BaMgAl_{10}O_{17}$, $Mg_5(PO_4)_3Cl$, $Ca_5(PO_4)_3Cl$, $Sr_5(PO_4)_3Cl$, $Ba_5(PO_4)_3Cl$, $EuSi_9Al_{19}ON_{31}$, and $La_{1-x}Ce_xAl(Si_{6-z}Al_z)(N_{10-z}O_z)$, for example. In an exemplary embodiment, the yellow phosphor may include at least one of $SrGa_2S_4$:$Eu^{2+}$, $Sr_2Ga_2S_5$:$Eu^{2+}$, and YAG:$Ce^{3+}$, for example.

In an exemplary embodiment, the quantum dots included in the color conversion layer may be Group II-VI based quantum dots including Cd/Se/ZnS, CdSe/CdS/ZnS, ZnSe/ZnS, or ZnTe/ZnSe, for example. In an alternative exemplary embodiment, the quantum dots may be Group III-V quantum dots including InP/ZnS or quantum dots including CuInS(2)/ZnS, for example. In an exemplary embodiment, the quantum dots may be dispersed at a concentration of about 3 grams per cubic centimeter (g/cm$^3$) to about 6 g/cm$^3$ in the color conversion layer CF, for example. When the color conversion layer CF includes a quantum dot, the wavelength range of light converted by the quantum dot may be changed depending on the size of the quantum dot. In an exemplary embodiment, depending on the size of a quantum dot, the quantum dot may be determined as any one of a quantum dot emitting green light, a quantum dot emitting red light, and a quantum dot emitting blue light, for example.

Figure 2:
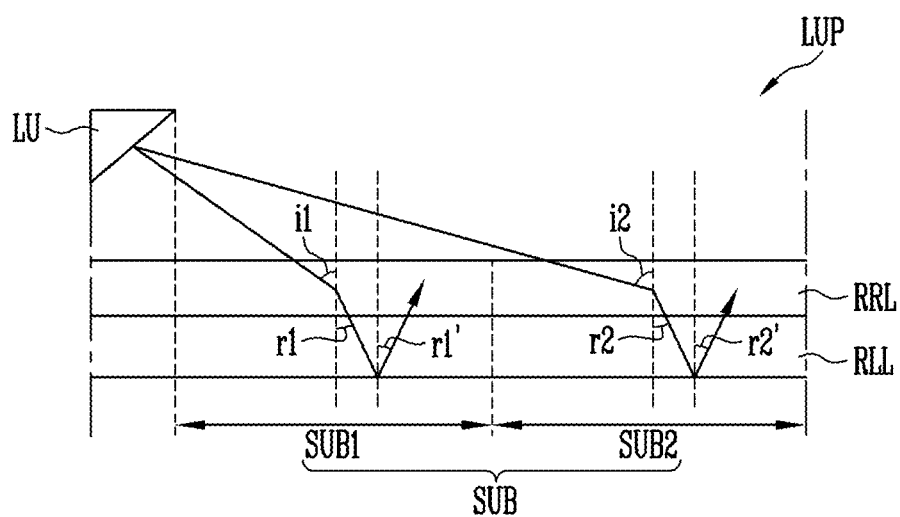
FIG. 2 is an enlarged cross-sectional view illustrating an exemplary embodiment of a light source unit of the display device according to the invention.

FIG. 2 is an enlarged cross-sectional view illustrating the light source unit of the display device according to the exemplary embodiment of the invention. FIGS. 3A to 3D are cross-sectional views illustrating behaviors of light emitted from the light source in the refractive layer in the display device according to the exemplary embodiment of the invention.

According to FIG. 2, light emitted from the light source LU is refracted in the refractive layer RRL and then incident onto the reflective layer RLL. The light incident onto the reflective layer RLL is reflected from the reflective layer RLL and is incident into the display panel by again passing through the refractive layer RRL.

According to the invention, the refractive layer RRL has different refractive indices depending on distances from the light source LU to the refractive layer RRL. Specifically, the refractive index of the refractive layer RRL may become larger as the distance from the light source LU to the refractive layer RRL becomes longer. As the refractive layer RRL has different refractive indices depending on distances from the light source LU to the refractive layer RRL, lights transmitted through different regions of the refractive layer RRL can have refraction angles substantially equal to each other.

Since the incident angle of light incident onto the refractive layer RRL is changed depending on distances from the light source LU to the refractive layer RRL, when the refractive layer RRL has different refractive indices depending on positions thereof, refraction angles of lights incident onto the refractive layer RRL may all be different. Specifically, as the distance between the refractive layer RRL and the light source LU becomes longer, the incident angle of light incident onto the refractive layer RRL becomes larger. Therefore, when the refractive layer RRL has the same refractive index in all regions thereof, light incident onto a region distant from the light source LU has a relatively large refraction angle as compared with light incident onto a region close to the light source LU.

When the light source LU emits lights in the Lambertian form, light incident onto a region distant from the light source LU may not be viewed to eyes of a user after the light is reflected from the reflective layer RLL. This is because the refraction angle and reflection angle of light incident onto the region distant from the light source LU are large, and the intensity of light reflected from the reflective layer RLL is weak. As described above, when the light source LU emits lights in the Lambertian form, the surface of the reflective layer RLL may have Lambertian reflectance. In this case, as light is incident more vertically onto the reflective layer RLL, the intensity of light reflected from the reflective layer RLL becomes larger. Light having a relatively large refraction angle may be incident onto the reflective layer RLL in a form having a relatively large reflection angle. In this case, the intensity of light obtained as the light having the large reflection angle is reflected from the reflective layer RLL is relatively weak. In some cases, the light having the large reflection angle may not be again transmitted through the refractive layer RRL after the light is reflected from the reflective layer RLL. Therefore, light having a large reflection angle among the lights emitted from the light source LU is lost while being reflected from the reflection layer RLL, and may not be viewed to the eyes of the user. The loss of light may decrease the brightness of a screen, and as a result, the quality of a screen output by the display device may be considerably degraded.

The refractive index of the refractive layer RRL according to the invention may become larger as the distance from the light source LU to the refractive layer RRL becomes longer. Hence, light incident onto a region distant from the light source LU is refracted further than light incident onto a region close to the light source LU. Therefore, lights refracted in different regions of the refractive layer RRL may have refraction angles substantially equal to each other. According to the invention, since the refraction angle determines a reflection angle of light incident onto the reflective layer RLL, reflection angles of lights incident onto the reflective layer RLL by passing through different regions of the refractive layer RRL are substantially equal to each other. In an exemplary embodiment, the refraction angle may be about 0 degree to about 30 degrees. According to an exemplary embodiment of the invention, light transmitted through the refractive layer RRL has the refraction angle range, so that the intensity of light is not decreased even when the light transmitted through the refractive layer RRL is reflected from the reflective layer RLL. Specifically, when the light source LU emits lights in the Lambertian form, light having a refraction angle of about 0 degree to about 30 degrees may be incident relatively vertically to the reflective layer RLL. Therefore, the intensity of light reflected from the reflective layer RLL is relatively large, and the amount of light lost while being refracted and the reflected is relatively small. In addition, according to the invention, light has a relatively uniform refraction angle in all regions of the refractive layer RRL, and hence a uniform intensity of light can be obtained in the whole of the display area DA. Thus, according to the invention, it is possible to prevent a spot from occurring on a screen output in a partial area of the display area DA, particularly, a region distant from the light source LU.

In order to have different refractive indices depending on distances as described above, the refractive layer RRL may include a plurality of sub-layers SUB having different refractive indices. In an exemplary embodiment, referring to FIG. 2, the refractive layer RRL includes two sub-layers SUB1 and SUB2, for example. A first sub-layer SUB1 and a second sub-layer SUB2 have refractive indices different from each other. In this case, the second sub-layer SUB2 distant from the light source LU has a refractive index larger than that of the first sub-layer SUB1 relatively close to the light source LU. Therefore, an incident angle i2 of light incident onto the second sub-layer SUB2 is larger than that i1 of light incident onto the first sub-layer SUB1 (i2>i1), but refraction angles r1 and r2 of the two lights may be substantially equal to each other (r1≈r2). In addition, since the refraction angles r1 and r2 of the two lights are substantially equal to each other (r1≈r2), reflection angles r1' and r2' of the two lights may also be substantially equal to each other (r1'≈r2').

Figure 3A:
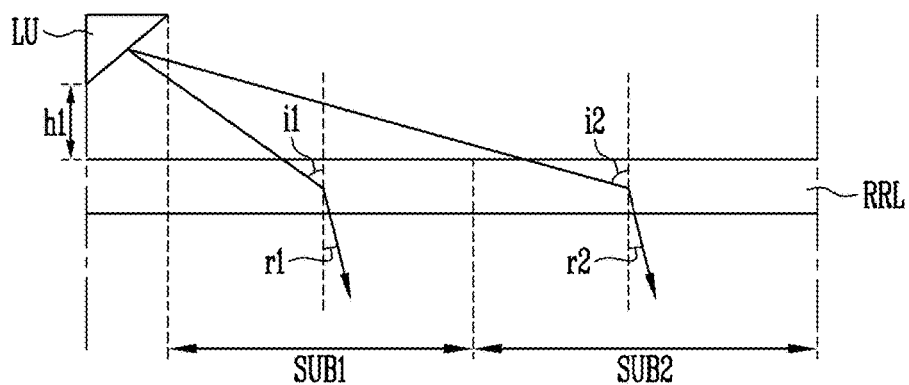
FIGS. 3A to 3D are sectional views illustrating behaviors of light emitted from an exemplary embodiment of a light source in a refractive layer in the display device according to the invention.

According to an exemplary embodiment of the invention, a plurality of sub-layers SUB may be provided not to overlap with each other on a plane. As the refractive index of each of the plurality of sub-layers SUB becomes larger, the sub-layer SUB may be provided distant from the light source LU. According to FIG. 3A, the refractive layer RRL includes a first sub-layer SUB1 and a second sub-layer SUB2, and the first sub-layer SUB1 and the second sub-layer SUB have refractive indices different from each other. Specifically, the second sub-layer SUB2 relatively distant from the light source LU has a refractive index larger than that of the first sub-layer SUB1 relatively close to the light source LU. Therefore, an incident angle i2 of light incident onto the second sub-layer SUB2 is larger than that i1 of light incident onto the first sub-layer SUB1 (i2>i1), but refraction angles r1 and r2 of the two lights may be substantially equal to each other (r1≈r2). Since a first refraction angle r1 and a second refraction angle r2 are substantially equal to each other, the light having the first refraction angle r1 and the light having the second refraction angle r2 may be reflected at angles substantially equal to each other on the reflective layer RLL. Accordingly, the intensity of light reflected from the reflective layer RLL and the brightness of light viewed to the user can be uniform in the whole of the display area. However, the number of sub-layers SUB shown in FIG. 3A is merely illustrative. Therefore, the refractive layer RRL including sub-layers of which number is larger or smaller than that of two sub-layers SUB1 and SUB2.

Figure 3B:
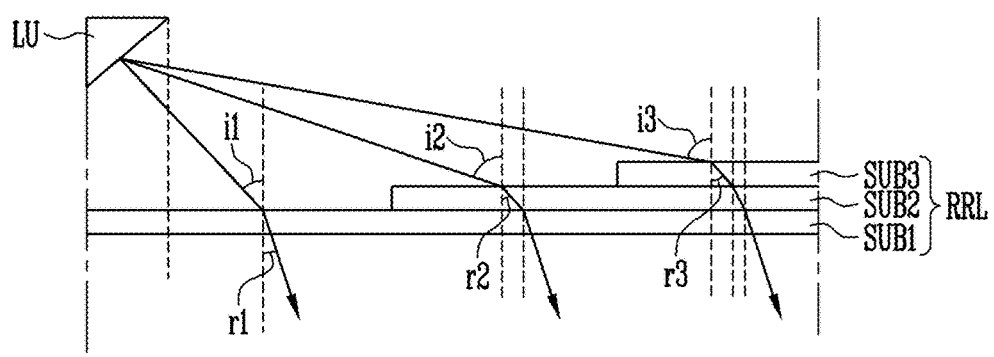

According to an exemplary embodiment of the invention, a plurality of sub-layers SUB may have a form in which the plurality sub-layers SUB are sequentially stacked from a sub-layer having the smallest refractive index. In addition, the number of stacked sub-layers SUB may increase as the sub-layers SUB are more distant from the light source LU. According to FIG. 3B, the refractive layer RRL has a form in which a first sub-layer SUB1, a second sub-layer SUB2, and a third sub-layer SUB3 are sequentially stacked. In addition, the first sub-layer SUB1 has the widest area among the three sub-layers SUB1, SUB2, and SUB3. The second sub-layer SUB2 is provided on the first sub-layer SUB1. The third sub-layer SUB3 is provided on the second sub-layer SUB2. The third sub-layer SUB3 has an area smaller than that of the second sub-layer SUB2. Therefore, the first, second, and third sub-layers SUB1, SUB2, and SUB3 are all formed in a region most distant from the light source LU. In addition, only the first sub-layer SUB1 is formed in a region closest to the light source LU. That is, the number of sub-layers SUB may increase as the distance from the light source LU becomes longer. The first to third sub-layers SUB1, SUB2, and SUB3 have refractive indices different from one another. The third sub-layer SUB3 formed in a region most distant from the light source LU has the largest refractive index. In addition, the second sub-layer SUB2 relatively distant from the light source LU has a refractive index larger than that of the first sub-layer SUB1 relatively close to the light source LU. Light incident onto a region distant from the light source LU is sequentially transmitted through the third sub-layer SUB3, the second sub-layer SUB2, and the first sub-layer SUB1. Since the light incident onto the region is transmitted through the third sub-layer SUB3 having the largest refractive index, the light is refracted further than light incident onto a region relatively close to the light source LU. Thus, although incident angles i3, i2, and i1 of lights incident onto regions are different from one another (i3>i2>i1), refraction angles i3, i2, and i1 of the lights are substantially equal to each other (r3≈r2≈r1). Accordingly, the intensity of light reflected from the reflective layer RLL and the brightness of light viewed to the user can be uniform in the whole of the display area. However, the number of sub-layers SUB shown in FIG. 3B is merely illustrative. Therefore, the refractive layer RRL including sub-layers of which number is larger or smaller than that of three sub-layers SUB1, SUB2, and SUB3.

According to an exemplary embodiment of the invention, a plurality of sub-layers SUB may have a form in which the plurality of sub-layers SUB is sequentially stacked from a sub-layer having the largest refractive index. In addition, the number of stacked sub-layers SUB may increase as the sub-layers SUB are more distant from the light source LU. In this case, the relationship between areas of the sub-layers, the relationship between refractive indices of the sub-layers, and the like are identical to those in the form in which the plurality sub-layers SUB are sequentially stacked from a sub-layer having the smallest refractive index.

Figure 3C:
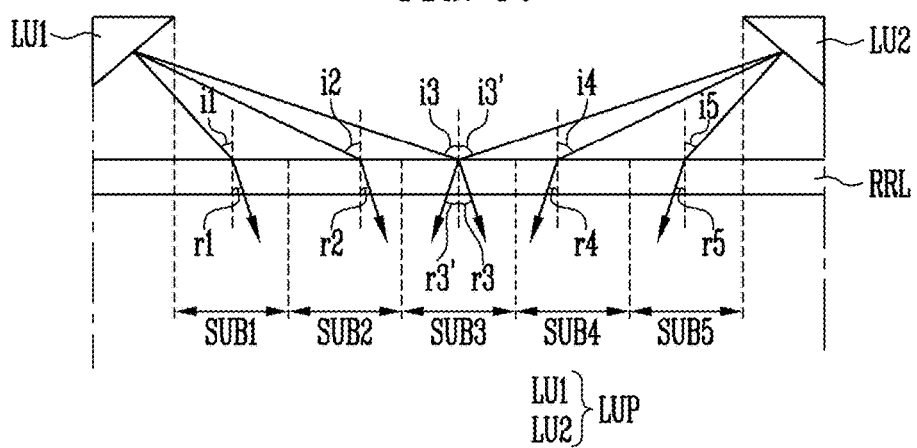
Figure 3D:
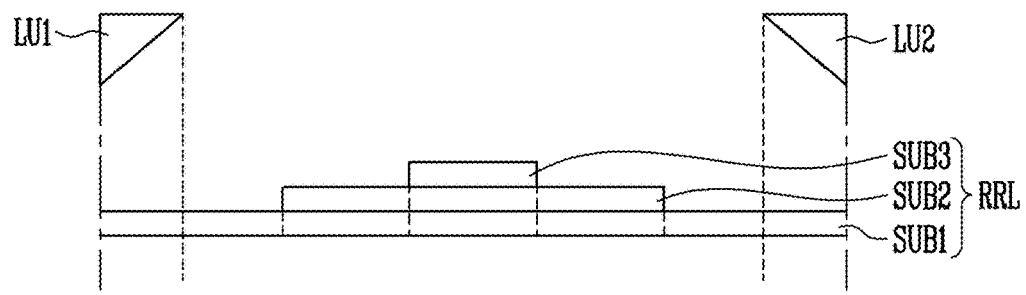

According to FIGS. 3C and 3D, the light source unit LUP according to the exemplary embodiment of the invention may include a plurality of light sources LU1 and LU2. In this case, in a plan view, the plurality of light sources LU1 and LU2 may be provided at both sides of the refractive layer RRL, respectively.

According to FIG. 3C, the light source unit LUP includes a first light source LU1 and a second light source LU2, and the refractive layer RRL includes a plurality of sub-layers SUB1, SUB2, SUB3, SUB4, and SUB5 provided not to overlap with each other on a plane. Each of the sub-layers SUB1, SUB2, SUB3, SUB4, and SUB5 is provided distant from the light sources LU1 and LU2 as the refractive index of the sub-layer becomes larger. Therefore, when the first light source LU1 and the second light source LU2 are provided at both sides of the refractive layer RRL, respectively, the plurality of sub-layers SUB1, SUB2, SUB3, SUB4, and SUB5 may be symmetrically disposed based on their refractive indices. Specifically, in the case of the third sub-layer SUB3 most distant from both of the first light source LU1 and the second light source LU2, the refractive index of a third sub-layer SUB3 is larger than those of first, second, fourth, and fifth sub-layers SUB1, SUB2, SUB4, and SUB5 relatively close to any one of the first light source LU1 and the second light source LU2. Similarly, the refractive indices of the second and fourth sub-layers SUB2 and SUB4 are larger than those of the first and fifth sub-layers SUB1 and SUB5. The refractive indices of the second and fourth sub-layers SUB2 and SUB4 and the first and fifth sub-layers SUB1 and SUB5, which are symmetrically provided, may be substantially equal to each other. These refractive indices may be determined according to relative positions from the light sources LU1 and LU2. Consequently, although incident angles i1, i2, i3, i4, and i5 of lights incident onto the respective sub-layers SUB1, SUB2, SUB3, SUB4, and SUB5 are different from one another, refraction angles r1, r2, r3, r4, and r5 of the lights may be substantially equal to one another. Accordingly, even when the light source unit LUP includes a plurality of light sources LU1 and LU2, the intensity of light reflected from the reflective layer RLL and the brightness of light viewed to the user can be uniform in the whole of the display area. However, the number of sub-layers SUB shown in FIG. 3C is merely illustrative. Therefore, the refractive layer RRL including sub-layers of which number is larger or smaller than that of five sub-layers SUB1, SUB2, SUB3, SUB4, and SUB5. In an exemplary embodiment, the incident angle i3 may be equal to an incident angle i3', and the refraction angle r3 may be equal to a refraction angle r3'.

According to FIG. 3D, the light source unit LUP (refer to FIG. 3C) includes a first light source LU1 and a second light source LU2, and the refractive layer RRL includes a first sub-layer SUB1, a second sub-layer SUB2, and a third sub-layer SUB3, which are sequentially stacked. The relationship between refractive indices of the first to third sub-layers SUB1, SUB2, and SUB3 is the same as described with reference to FIG. 3B. Therefore, the first sub-layer SUB1 has the smallest refractive index, and the third sub-layer SUB3 has the largest refractive index. The first to third sub-layers SUB1, SUB2, and SUB3 have areas different from one another. The first sub-layer SUB1 having the smallest refractive index has the widest area, and the third sub-layer SUB3 having the largest refractive index has the smallest area. In addition, the first to third sub-layers SUB1, SUB2, and SUB3 may be stacked to have a symmetrical shape. Specifically, only the third sub-layer SUB3 having the largest refractive index may be stacked at a central portion most distant from both of the first light source LU1 and the second light source LU2. In addition, the second sub-layer SUB2 and the first sub-layer SUB1 may be sequentially stacked symmetrically with respect to the central portion. Accordingly, the light source unit LUP includes a plurality of light sources LU1 and LU2, the intensity of light reflected from the reflective layer RLL and the brightness of light viewed to the user can be uniform in the whole of the display area. However, the number of sub-layers SUB shown in FIG. 3D is merely illustrative. Therefore, the refractive layer RRL including sub-layers of which number is larger or smaller than that of three sub-layers SUB1, SUB2, and SUB3.

According to an exemplary embodiment of the invention, the refractive layer RRL may include one to twenty sub-layers SUB. The number of sub-layers SUB may be changed depending on the size of the refractive layer RRL and the distance between the refractive layer RRL and the light source LU. In general, as the distance between the refractive layer RRL and the light source LU becomes shorter, and the size of the refractive layer RRL becomes larger, a larger number of sub-layers SUB may be included. However, when sub-layers SUB of which number exceeds 20 are formed in different regions of the refractive layer RRL, the number of desired masks increases, and therefore, process cost may increase.

When the light source LU is spaced apart from the refractive layer RRL at a first height $h_1$ (refer to FIG. 3A), and the refractive layer RRL has a first length $d_1$ (refer to FIG. 1), the first height $h_1$ and the first length $d_1$ may satisfy the following Expression 1.

$$i2 < h_1/d_1 < i3 \qquad \text{<Expression 1>}$$

According to Expression 1, the first height $h_1$ may be relatively smaller than the first length $d_1$. That is, although the light source LU is spaced apart from the refractive layer RRL, the spaced height may be relatively small as compared with the size of the entire refractive layer RRL or display device. Therefore, as the relationship of Expression 1 is satisfied, the display device according to the invention may have a thin thickness. However, as the display device has a thin thickness, light emitted from the light source LU may be incident onto the refractive layer RRL at a relatively large angle. Accordingly, as described above, the refractive index of the refractive layer RRL may be changed depending on the distance from the light source LU to the refractive layer RRL.

According to an exemplary embodiment of the invention, thicknesses of a plurality of sub-layers SUB may be equal to one another. In an exemplary embodiment, the thickness of the sub-layer SUB may be about 8 micrometers (µm) to about 12 µm, for example. As the plurality of sub-layers SUB has the same thickness, uniform refraction and reflection angles can be ensured even when the sub-layers SUB are provided not to overlap with each other on a plane. In addition, the sub-layer SUB satisfies the thickness range, so that the thickness of the entire display device can become thin. However, when the thickness of the sub-layer SUB is less than about 8 μm, light may be imperfectly refracted by the refractive layer RRL.

According to an exemplary embodiment of the invention, the refractive layer RRL may have a refractive index of about 1.3 to about 5.0, for example. As the refractive layer RRL has the refractive index range, light transmitted through the refractive layer RRL may have a refraction angle close to the verticality even when the refractive layer RRL has a thin thickness and a relatively small distance $h_1$ between the refractive layer RRL and the light source LU. In an exemplary embodiment, the plurality of sub-layers SUB may have a difference in refractive index of about 0.01 to about 0.07 therebetween, for example. The plurality of sub-layers SUB may have refractive indices equal to or different from one another. In an exemplary embodiment, in FIG. 3B, a difference in refractive index between the first and second sub-layers SUB1 and SUB2 may be different from that in refractive index between the second and third sub-layers SUB2 and SUB3, for example. When the difference in refractive index between the sub-layers is less than about 0.01, an excessive number of sub-layers may be desired so as to realize a difference in refractive index depending on the distance from the light source LU. In addition, when the difference in refractive index between the sub-layers exceeds about 0.07, the difference in refractive index between the sub-layers increases, and therefore, it may be difficult to ensure uniform refraction and reflection angles. Materials of the respective sub-layers may be different from one another so as to realize a difference in refractive index.

The display device according to the exemplary embodiment of the invention can be employed in various electronic devices. In an exemplary embodiment, the display device is applicable to televisions, notebook computers, cellular phones, smart phones, smart pads, portable media players ("PMPs"), personal digital assistants ("PDAs"), navigations, various wearable devices such as smart watches, and the like.

According to the invention, it is possible to provide a display device capable of outputting a high-contrast and clear screen.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:
   a light source unit which includes:
      a reflective layer which reflects light incident thereonto;
      a refractive layer provided on the reflective layer; and
      a light source which is provided to be spaced apart from the refractive layer, and
   a display panel provided on the light source unit,
   wherein the light source is disposed between the display panel and the refractive layer and emits light toward a surface of the refractive layer, and
   wherein the refractive layer has different refractive indices depending on distances from the light source to the refractive layer.

2. The display device of claim 1, wherein the refractive layer refracts incident light such that light transmitted through an arbitrary region of the refractive layer has a refraction angle of about 0 degree to about 30 degrees.

3. The display device of claim 1, wherein the refractive index of the refractive layer becomes larger as the distance from the light source to the refractive layer becomes longer.

4. The display device of claim 1, wherein the refractive layer includes a plurality of sub-layers having refractive indices different from one another.

5. The display device of claim 4, wherein the plurality of sub-layers is provided not to overlap with each other on a plane.

6. The display device of claim 5, wherein each of the plurality of sub-layers is provided more distant from the light source as the refractive index of the sub-layer becomes larger.

7. The display device of claim 4, wherein the plurality of sub-layers has a form in which the plurality sub-layers are sequentially stacked from a sub-layer having a smallest refractive index, and a number of sub-layers increases as the distance from the light source becomes longer.

8. The display device of claim 4, wherein the plurality of sub-layers has a form in which the plurality sub-layers is sequentially stacked from a sub-layer having a largest refractive index, and a number of sub-layers increases as the distance from the light source becomes longer.

9. The display device of claim 4, wherein the plurality of sub-layers has a difference in refractive index of about 0.01 to about 0.07 therebetween.

10. The display device of claim 4, wherein the refractive layer includes one to twenty sub-layers.

11. The display device of claim 4, wherein thicknesses of the plurality of sub-layers are equal to one another.

12. The display device of claim 11, wherein a sub-layer of the plurality of sub-layers has a thickness of about 8 micrometers to about 12 micrometers.

13. The display device of claim 1, wherein the refractive layer has a refractive index of about 1.3 to about 5.0.

14. The display device of claim 1, further comprising a color conversion layer provided on the refractive layer.

15. The display device of claim 1, wherein the light source is provided in plural numbers,
   wherein, in a plan view, the plurality of light sources is provided at both sides of the refractive layer, respectively.

16. The display device of claim 1, wherein the light source is spaced apart from the refractive layer at a first height $h_1$, and the refractive layer has a first length $d_1$,
   wherein the first height and the first length satisfy the following Expression 1:

$$i2 < h_1/d_1 < i3. \qquad \text{<Expression 1>}$$

17. The display device of claim 1, wherein the light source emits light in a Lambertian form.

18. The display device of claim 1, wherein the display device has a display area and a non-display area, the refractive layer is provided on the display area, and the light source is provided on the non-display area.

19. The display device of claim 1, wherein the display panel further includes a liquid crystal layer, and a first electrode and a second electrode, which are provided in a state in which the first and second electrodes are spaced apart from each other with the liquid crystal layer interposed therebetween.

* * * * *